J. D. SWEAT.
SAFETY PIPE JOINT.
APPLICATION FILED MAY 24, 1918.
1,279,935.
Patented Sept. 24, 1918.
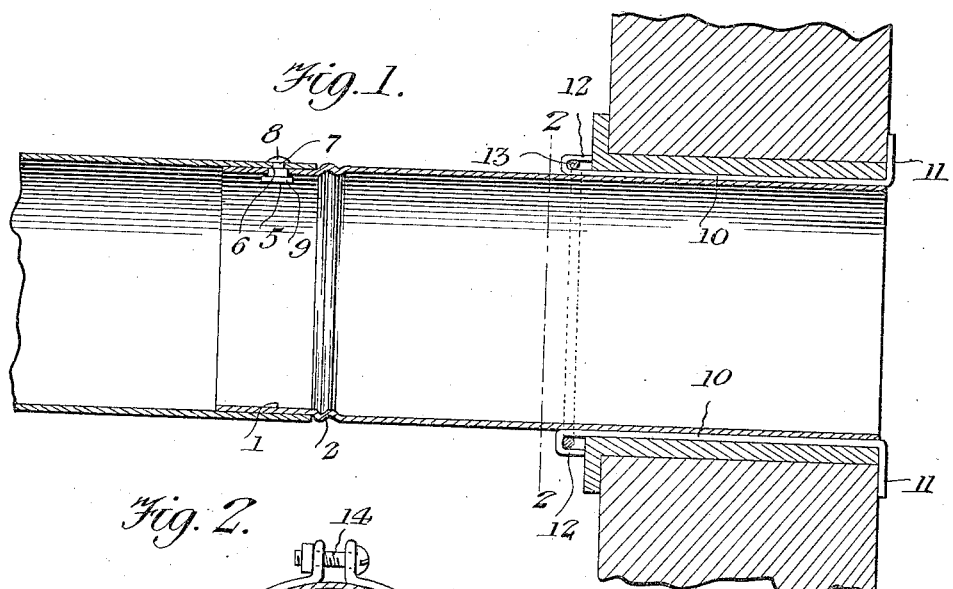
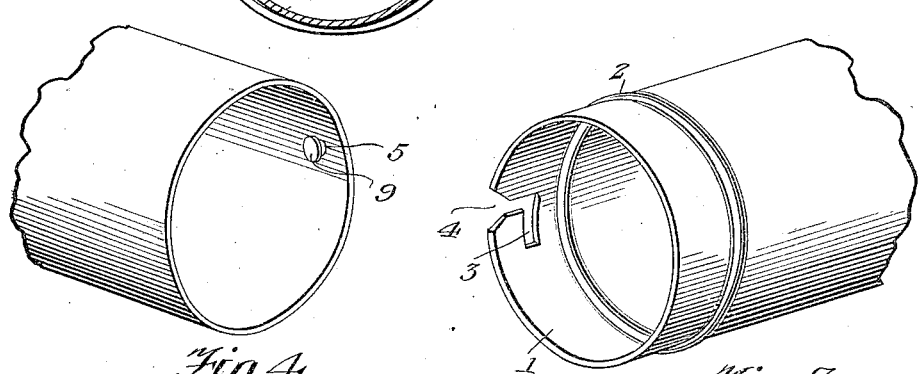
Witnesses
Le Roy Kauffman
J. W. Garner
Inventor
J. D. Sweat
By Victor J. Evans
Attorney

UNITED STATES PATENT OFFICE.

JOHN D. SWEAT, OF GALESBURG, ILLINOIS, ASSIGNOR OF ONE-HALF TO W. T. SWEAT, OF GALESBURG, ILLINOIS.

SAFETY PIPE-JOINT.

1,279,935.  Specification of Letters Patent.  Patented Sept. 24, 1918.

Application filed May 24, 1918. Serial No. 236,379.

*To all whom it may concern:*

Be it known that I, JOHN D. SWEAT, a citizen of the United States, residing at Galesburg, in the county of Knox and State of Illinois, have invented new and useful Improvements in Safety Pipe-Joints, of which the following is a specification.

This invention relates to improvements in stove pipe joints for forming a secure and firm connection of the pipes so that they cannot be pulled apart or pushed together and yet can be readily disconnected when required, the invention also relating to improvements in means for securing a stove pipe in a thimble or flue opening so that the stove pipe cannot be pushed into or casually drawn out of the thimble.

With the above and other objects in view, the invention consists in the construction, combination and arrangement of devices hereinafter described and claimed.

In the accompanying drawings:—

Figure 1 is a sectional view of a stove pipe joint constructed and arranged in accordance with my invention, and also showing my improved means for securing the stove pipe in a thimble or flue opening.

Fig. 2 is a transverse sectional view of the same on the plane indicated by the line 2—2 of Fig. 1.

Figs. 3 and 4 are detail perspective views of the pipe members and showing the same disconnected.

In the embodiment of my invention, I provide each stove pipe member with the usual slightly reduced end 1 and the usual bead 2 near said end and also provide a right-angled bayonet slot 3 in said end and the outer end of which is slightly widened as at 4. The opposite end of each stove pipe member is provided with a headed rivet 5 which extends thereinto, said rivet being shouldered as at 6 to form a stud 7 which fits in an opening in the pipe member and is swaged or upset as at 8 and the head 9 of the rivet being of suitable diameter.

When the pipes are jointed together the smaller end of one member is inserted in the larger end of the other member and so that the rivet enters the bayonet slot and one of the members is then slightly turned so that the rivet is caused to move to the outer end of that portion of the slot which is parallel with the end of the pipe. One or more of the right angle bayonet slots and one or more of the rivets may be provided as desired.

By the construction of the pipe joint with the right-angled bayonet slot there is no tendency of the pipes to work loose at the joint. The pipes may be either stove pipes or hot air pipes or other kinds of pipes, within the scope of the invention.

I also provide means for securing the stove pipe in a thimble of a flue. The said securing means comprises a pair of sheet metal strips 10 which are arranged in opposite sides of the thimble and each of which has an outwardly bent arm 11 at its inner end and is provided at its outer end with a hook 12. A band 13, which may be made of wire, passes around the stove pipe and has its ends provided with eyes through which a bolt 14 passes. By tightening the bolt the band is tightened. The band is engaged by the hooks 12 so that the band and the hooks prevent the stove pipe from being casually withdrawn from the flue or from being pushed too far into the same, as will be understood.

While I have herein shown and described a preferred embodiment of my invention, I would have it understood that changes may be made in the form, proportion and construction of the several parts, without departing from the spirit of my invention, and within the scope of the appended claim.

Having thus described the invention, I claim:—

A stove pipe holder comprising a pair of strips for arrangement in opposite sides of a thimble and between the same and the stove pipe, said strips having outwardly bent arms at their inner ends to engage the inner side of the flue and being provided with hooks at their outer ends, and a band around the pipe, engaged with said hooks, said band being open at one side and the ends thereof being connected together by an adjusting and tensioning bolt.

In testimony whereof I affix my signature.

JOHN D. SWEAT.

Copies of this patent may be obtained for five cents each, by addressing the "Commissioner of Patents, Washington, D. C."